United States Patent
Ding et al.

(10) Patent No.: US 7,792,647 B1
(45) Date of Patent: Sep. 7, 2010

(54) QUANTITATIVELY MEASURING ERROR CAUSING PARAMETERS IN FLUID HANDLING

(75) Inventors: Zhong Ding, Pittsford, NY (US); Mark Sawczuk, Rochester, NY (US); Scott Stearns, Zurich (CH); Muhidin Lelic, Manchester, CT (US)

(73) Assignee: Ortho-Clinical Diagnostics, Inc., Rochester, NY (US)

( * ) Notice: Subject to any disclaimer, the term of this patent is extended or adjusted under 35 U.S.C. 154(b) by 81 days.

(21) Appl. No.: 11/484,209

(22) Filed: Jul. 11, 2006

Related U.S. Application Data

(60) Provisional application No. 60/698,415, filed on Jul. 12, 2005.

(51) Int. Cl.
*G01B 5/28* (2006.01)
*G01B 5/30* (2006.01)

(52) U.S. Cl. ............... 702/35; 417/53; 222/61; 222/63; 73/863.32; 73/864; 73/864.01; 73/864.11; 73/864.12; 73/864.13; 436/43; 436/54; 436/180

(58) Field of Classification Search ............ 702/35; 417/53; 222/61, 63; 73/863.32, 864, 864.01, 73/864.11, 864.12, 864.13; 436/43, 54, 180
See application file for complete search history.

(56) References Cited

U.S. PATENT DOCUMENTS

| 6,158,269 A * | 12/2000 | Dorenkott et al. ............... 73/37 |
| 6,478,547 B1 * | 11/2002 | Savard et al. ................. 417/53 |
| 6,913,933 B2 | 7/2005 | Jacobs et al. |

FOREIGN PATENT DOCUMENTS

| WO | WO 97/22007 A1 | 1/1997 |
| WO | WO 98/45205 A2 | 10/1998 |

OTHER PUBLICATIONS

A. Savitzky and M. Golay, Smoothing and Differentiation of Data by Simplified Least Squares Procedures, Analytical Chemistry, vol. 36, No. 8, Jul. 1964.

* cited by examiner

*Primary Examiner*—Sujoy K Kundu
(74) *Attorney, Agent, or Firm*—Todd J. Burns

(57) ABSTRACT

A method for quantitatively measuring error causing physical parameters in a fluid handling system, includes: measuring the pressure of air between a piston of a pump and a liquid being handled; detecting a pressure abnormality; determining the time at which the pressure abnormality begins to occur; and based on the time of the pressure abnormality determining the magnitude of the physical parameter causing the pressure abnormality. In a preferred embodiment, the error causing physical parameter is a bubble and the fluid handling is an aspirate operation in a diagnostic analyzer.

35 Claims, 8 Drawing Sheets

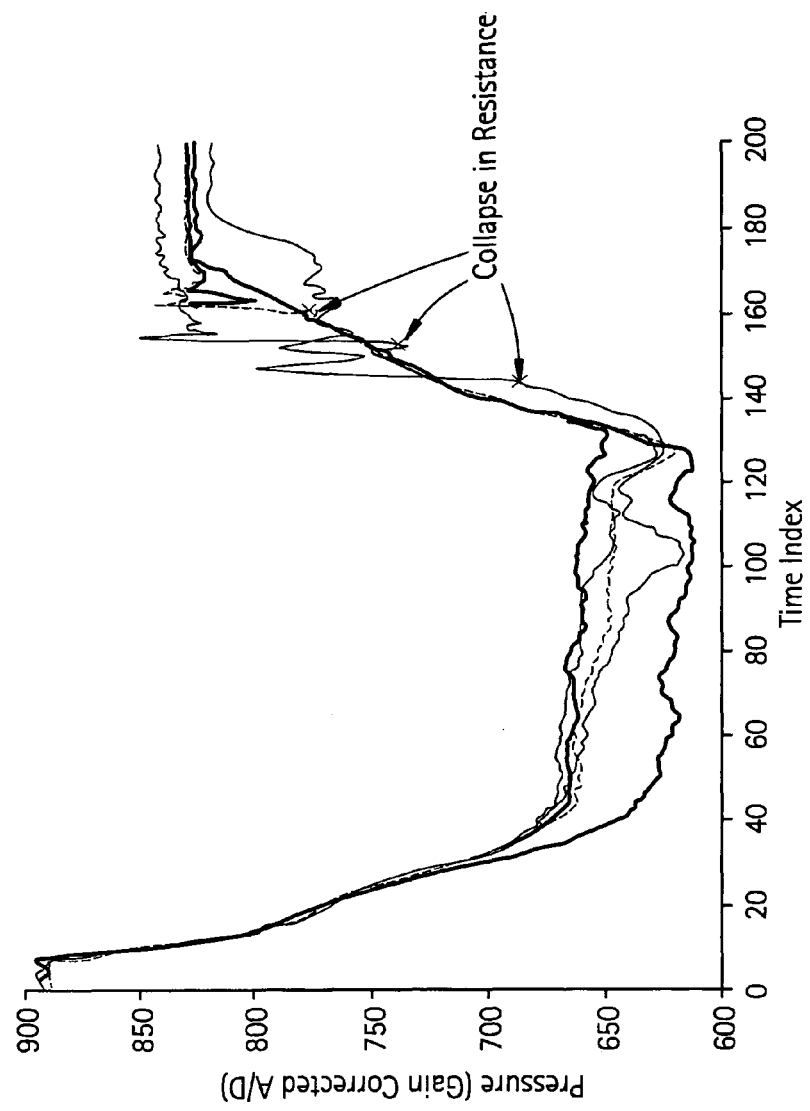

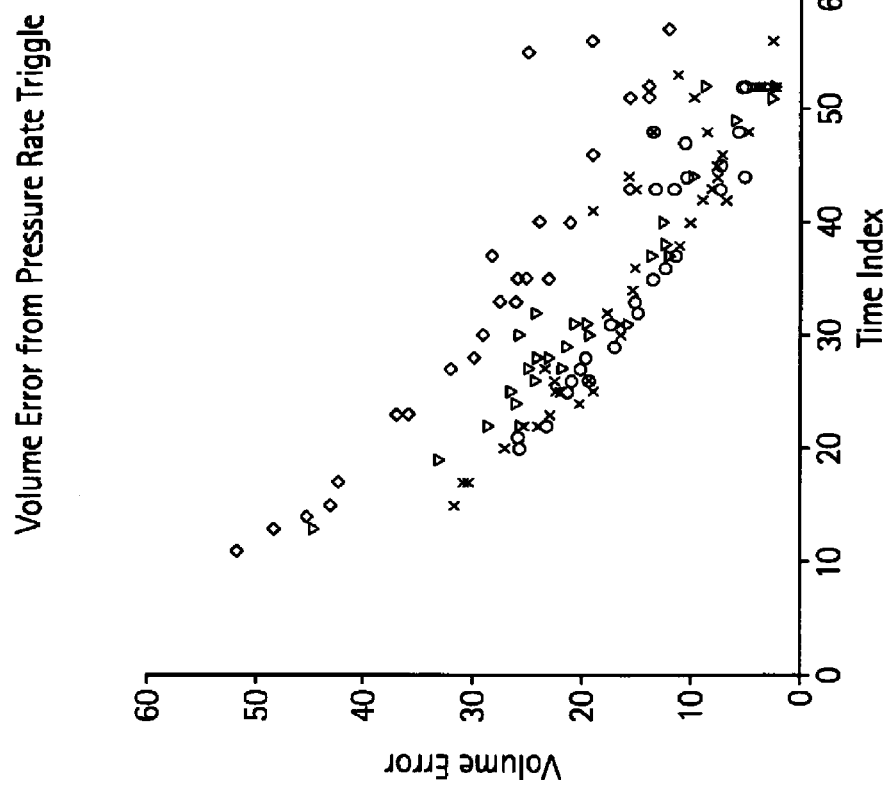

QUANTITATIVELY MEASURING ERROR CAUSING PARAMETERS IN FLUID HANDLING

This application claims priority to provisional application U.S. Ser. No. 60/698,415, filed Jul. 12, 2005, now abandoned.

BACKGROUND OF THE INVENTION

1. Field of the Invention

The present invention relates to detecting and quantitatively measuring error causing parameters in fluid handling, particularly liquid aspirating and dispensing in a diagnostic analyzer. In particular, the present invention relates to detecting and quantifying bubbles.

2. Description of the Related Art

In many diagnostic analyzers, accurate aspiration or dispense of a sample or reagent is an important factor in determining dispensing accuracy and sample quality. Governmental regulatory agencies, such as the United States Food and Drug Administration have strict regulations requiring the accurate aspiration and dispense of a liquid due to the risks of incorrectly performing assays or misreporting a sample integrity result. If an error is detected, the sample must be disregarded and the analysis rerun at considerable time and expense. If the magnitude of the error were known, it would be possible in some instances to adjust the analysis, such as by adding more or less of another component, without the necessity of disregarding the sample and rerunning the analysis.

One significant error in aspirating or dispensing is that insufficient liquid is aspirated due to an error causing physical parameter, such as air or bubble aspiration. Therefore, it is important to detect insufficient aspiration or dispensing accurately before starting any analysis, such as assays or performing sample integrity measurements. In the case of error inducing bubbles, it is known that insufficient aspiration is more likely to occur when 1) there is too little liquid in the container, 2) the aspiration is too fast, and 3) when the liquid viscosity is too high. Other error inducing parameters can include clogs, clots, debris, foam, etc.

In a typical diagnostic analyzer, a pressure sensor, such as a transducer, is mounted between the piston pump and the liquid being aspirated, and the pressure variation in the aspiration process is monitored. It is generally known in the art that monitoring pressure during aspiration can be used to determine the occurrence of unintended aspiration of air. See, e.g., WO 97/22007. While known art, such as the '007 patent publication, describes detecting the presence of an error, such known art does not teach quantitatively measuring such errors. It is also known to monitor pressure during the dispense of a fluid to determine the amount of fluid dispensed. See, e.g., WO 98/45205.

A significant technical challenge in the art has been to determine the volume or quantitative error in aspirated liquid from the pressure signature because of the random noise generated by the free surface of aspirated liquid when the error causing parameter, such as air (or a bubble), is aspirated into the tip. The pressure signature is further confounded by vibration of the aspirated liquid inside the tip while the viscosity and surface tension are unknown.

Due to the geometry variations at the tip-container juncture, free surface instability, and vibration in the system, it is difficult to correlate the pressure signature to the volume of the air inside the tip of an aspirating or dispensing probe. Although a curve fitting with proper models could provide useful information for the fluid property, it remains a challenge to predict the quantity of error, such as air volume aspirated. In an ideal system, the pressure level at the end of the aspiration should directly represent the amount of liquid aspirated. However, the pressure level is confounded by the surface tension and the meniscus configuration at the end of the tip, which is impossible to obtain in an on site process. Measuring the weight of the aspirated tip to determine the amount of liquid actually aspirated is not realistically feasible in a clinical setting.

U.S. Pat. No. 6,913,933 describes a fluid dispensing algorithm for a variable speed pump driven metering system.

For the foregoing reasons, there is a need to be able to quantify error causing parameters during a fluid handling process, particularly in an aspirating or dispensing process as opposed to simply detecting the presence of an error, in order to determine the amount of liquid actually being handled. There is also a need to be able to adjust an analysis based on the actual amount of liquid being handled in order to reduce the number of analyses that must be rerun altogether. There is also a need for an increased improvement in the robustness or reliability of a system to make such error detection and measurements.

SUMMARY OF THE INVENTION

The present invention is directed to a method that solves the foregoing problems of detecting and measuring the magnitude of an error inducing parameter in a fluid handling system, particularly in detecting and measuring gas bubbles, e.g., air, in a liquid dispense or aspirating probe of a diagnostic analyzer.

One aspect of the invention is directed to a process to determine the volume error in the aspiration process by detecting the time when error inducing physical parameter(s) are aspirated into the tip.

According to another aspect of the invention there has been provided a method for quantitatively measuring error causing physical parameters in a fluid handling system, which includes: measuring the pressure of air between a piston of a pump and a liquid being handled; detecting a pressure abnormality; determining the time at which the pressure abnormality begins to occur; and based on the time of the pressure abnormality determining the magnitude of the physical parameter causing the pressure abnormality. In a preferred embodiment, the error causing physical parameter is a bubble and the fluid handling is an aspirate operation.

In another preferred embodiment, the step of measuring pressure includes measuring the rate of change of the pressure, or the step of measuring pressure includes measuring the acceleration of the pressure change.

In another preferred embodiment, the step of detecting a pressure abnormality includes: establishing a measured pressure signature for a similar fluid aspirate or dispense where an error does not occur; comparing the rate of change of the pressure of the fluid being aspirated or dispensed with the rate of change in the measured pressure signature at the same time; and determining if the rate of change of the pressure being measured exceeds a threshold rate of change. Preferably, the step of determining the magnitude includes determining the flow rate of the fluid being handled and integrating the flow rate when the pressure abnormality is detected, wherein the integrated flow rate is proportional to the magnitude of the error. Alternatively, the magnitude of the error is determined by the time the error is detected using a calibration curve of time vs. error size.

According to another aspect of the invention, there has been provided a method for quantitatively measuring the volume of a bubble in a liquid handling system of a diagnostic analyzer during a liquid aspirate operation, which includes: measuring the pressure of air between a piston of a pump and a liquid being handled; detecting a pressure abnormality due to aspiration of the bubble; determining the time at which the pressure abnormality begins to occur; and based on the time of the pressure abnormality determining the magnitude of the bubble causing the pressure abnormality.

In a preferred embodiment, the method further includes: establishing a measured pressure signature for liquid aspirate where a bubble is not aspirated; determining a flow rate of the liquid being aspirated; measuring the pressure rate of change of the liquid being aspirated; comparing the pressure rate of change of the liquid being aspirated with the rate of change in the measured pressure signature at the same time; determining if the pressure rate of change being measured exceeds a threshold rate of change due to the aspiration of the bubble; integrating the flow rate if the threshold rate of change is exceeded, wherein the integrated flow rate is proportional to the bubble size.

In another preferred embodiment, the method further includes: establishing a measured pressure signature for a liquid aspirate where a bubble is not aspirated; determining a flow rate of the liquid being aspirated; measuring the acceleration of pressure change of the liquid being aspirated; comparing the acceleration of pressure change of the liquid being aspirated with the acceleration of pressure change in the measured pressure signature at the same time; determining if the pressure rate of change being measured exceeds a threshold rate of change due to the aspiration of the bubble; integrating the flow rate if the threshold rate of change is exceeded, wherein the integrated flow rate if proportional to the bubble size.

In another preferred embodiment, the method further includes: establishing a correlation between the size of the bubble and the time the aspiration of the bubble begins, wherein the determining the magnitude step comprises, measuring the time the bubble is aspirated and determining the bubble size based on the correlation between bubble size and time.

According to another aspect of the invention, there has been provided a method of aspirating a liquid used in a diagnostic analyzer, which includes: providing a source of liquid to be aspirated; providing a probe for aspirating and dispensing the liquid; moving the probe relative to the liquid; aspirating the liquid; quantitatively measuring the volume of a bubble aspirated with the liquid as described above; and determining the actual amount of liquid aspirated based on the detected size of the bubble.

Further objects, features and advantages of the present invention will be apparent to those skilled in the art from detailed consideration of the preferred embodiments that follow.

BRIEF DESCRIPTION OF THE DRAWINGS

FIG. 2 shows pressure signatures for normal and non-normal (i.e., air bubbles are present) aspiration according to one embodiment.

FIG. 3 shows the time when the threshold is triggered vs. the amount of volume error in aspirated liquid according to one embodiment.

DETAILED DESCRIPTION OF PREFERRED EMBODIMENTS

The present invention is broadly directed to a method of detecting and quantitating error causing physical parameters (hereinafter simply referred to as "error") that can occur during a liquid handling operation, preferably in a liquid aspiration or dispense process, more preferably in an aspirate process. In the present invention, determining the magnitude of an error in a fluid handling system occurs by determining the time when an error first enters a reduced portion of the fluid handling supply line, such as the tip of an aspirating and dispensing probe. The magnitude of the error can be determined, e.g., the volume of an air bubble, based on the time the error, such as an air bubble, is first detected, which in turn leads to the amount of time the error is detected. In turn, the magnitude of the error, can be used to determine the actual amount of liquid that is being handled. That is, once the magnitude of the error is known, this can be subtracted from the amount of fluid being handled to provide the amount of fluid actually handled, e.g., aspirated or dispensed. Based on the amount of fluid actually being handled, further actions can be taken, such as adding more or less of another component, e.g., a reagent or correcting a reported result.

The error to be detected can be any and all errors that are capable of being sensed in a liquid handling system. These include bubbles, clogs, clots, debris, and foam. The present invention works particularly well in detecting and quantifying gas inclusions, such as aspirated bubbles.

Detecting the presence of the error must first be performed. In the present invention, this is preferably detected by monitoring the pressure, preferably the pressure profile of the air between the piston and the aspirated liquid in the system, for example by using a well known in-line pressure transducer. In monitoring the pressure profile, a part of the fluid handling system preferably includes a narrow portion, such as the end of a probe tip, which significantly contributes to the resistance of fluid flow. When an error, such as an air bubble, enters the narrowed portion, the resistance suddenly diminishes as compared to no error, such that a pressure abnormality occurs. Alternatively, if an error such as a particulate enters the narrowed portion, the resistance will suddenly increase as compared to no error. The time the resistance suddenly diminishes or increases indicates the presence of the error. This feature of the invention can be described with reference to the preferred embodiment show in FIG. 1.

Figure 1A:
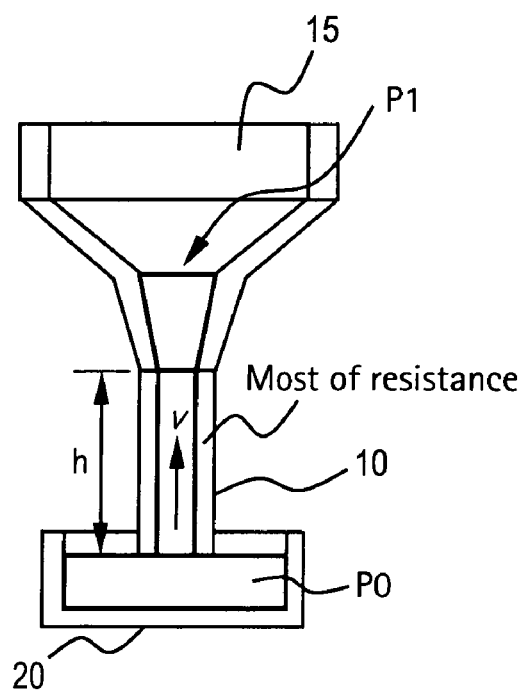
FIG. 1a shows the bottom of aspirating or dispensing probe including the tip orifice when liquid is initially aspirated into the orifice according to one embodiment of the present invention.

As shown in FIG. 1A, a tip 10 of an aspirating/dispense probe (not shown) is depicted. The diameter R of the orifice at the bottom of the tip is less than 0.5 mm, which is much smaller than diameters (>2 mm) in other regions 15 of the tip. For the same flow rate, the resistance is proportional to $1/R^4$. Due to the small diameter of the tip orifice at the bottom, the resistance at the bottom of the tip generally contributes most to the pressure signature measured in the pressure sensor. In a normal aspiration process, the piston pump retracts to create a vacuum that draws fluid from fluid container 20 into the tip. The air inside the tip is expanded and will contract from the expanded state after pump decelerates and/or stops, aspirating more liquid into the tip to approach equilibrium. The pressure rise (a return to equilibrium) decelerates due to a reducing pressure gradient in the process.

Figure 1B:
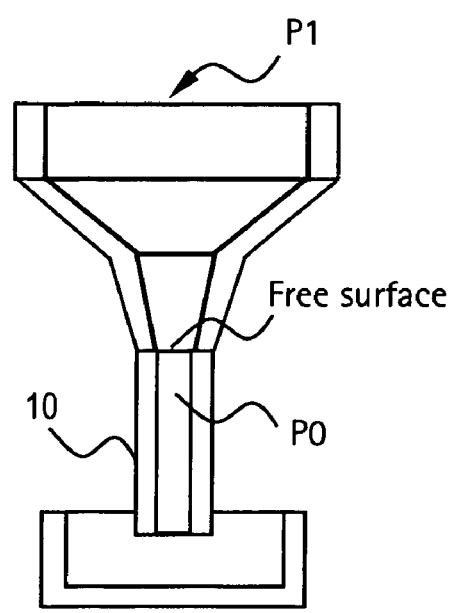
FIG. 1b shows the bottom of aspirating or dispensing probe including the tip orifice after liquid has been aspirated into the larger diameter section of the probe.

If air is aspirated as shown in FIG. 1B, the resistance to fluid flow at the orifice of the tip bottom almost disappears or suddenly diminishes, resulting in an acceleration of fluid flow inside the tip, leading to pressure rise acceleration instead of deceleration as experienced in a normal aspiration process as described above. As noted above, this physical phenomenon is used to detect the aspiration of the error, such as air. In FIG. 1B, $P0$ is ambient pressure, which is a constant, $P1$ is air pressure inside tip between liquid and piston, which varies during aspiration, $v$ is the velocity of the fluid and $h$ is the height of the tip bottom with narrow diameter, which is proportional to resistance.

Whether the pressure abnormality, such as pressure change, raises to the level that indicates an error or is simply noise or normal variation must be determined. That is, it must be determined if a threshold is reached to signify the presence of an error. One embodiment for determining such a threshold is to compare the measured pressure change with the pressure change from a measured pressure signature. As used herein "measured pressure signature" is simply a pressure signature of a similar fluid, including having a similar viscosity, handling event, except there is no error, such as an air bubble that occurs. As used herein a "similar fluid" is defined as a fluid having similar properties such as viscosity, density and wettability such that the similar fluid will exhibit a substantially identical pressure signature as the fluid being analyzed with no error. Preferably, the properties are within 15%, more preferably 10% of the fluid being analyzed for an error.

In a preferred embodiment, the rate of pressure change is measured and preferably compared with rate of change in the measured pressure signature to determine if a threshold change is reached. While the rate of pressure change as determined by the slope of the pressure signature or the acceleration of the pressure change as determined by the curvature of the pressure signature in a aspirate process having an error does not directly compare with a normal pressure profile, a comparison with the normal pressure signature will be sufficient for determining if the threshold has been reached.

If the threshold is reached, then an error is indicated. In a preferred embodiment, if a bubble is aspirated, the rate of pressure rise is larger than the threshold, which indicates that air is aspirated for the reasons explained in connection with FIG. 1B.

In a preferred embodiment, the threshold can be determined by calculating the acceleration of the pressure (the curvature of the pressure signature); if a positive acceleration of the pressure signature is detected after the pump decelerates, air is aspirated and the threshold is reached. The time when this acceleration starts is the time when air starts entering the tip. Again a normal pressure profile is used to determine the error threshold. FIG. 2 shows the measured pressure signature without aspirating air and the pressure signature in a fluid aspirate that includes air bubbles. A rapid rise in pressure indicates the collapse of resistance in the flow due to the presence of the air bubble. In the embodiment shown in FIG. 2 each one (1) time index is equal to 5 milliseconds.

The time the threshold is reached is then determined, preferably by a clock that runs simultaneously from the beginning of the fluid handling process. In those embodiments where air is aspirated, the time when the threshold is first reached is the time when air starts to be aspirated.

The magnitude of the error is related to the length of the pressure change. That is, in a fluid handling system, the time the pressure abnormality, such as acceleration pressure change or rate of pressure change, first occurs is noted or recorded. The length of time the pressure abnormality is an indication of the size of the error. For example, in an aspiration process, the earlier the air starts entering the tip, the more of the air is aspirated. Therefore in some embodiments the time when the air starts entering the tip is directly correlated with the amount of air aspirated.

A preferred method for quantifying the error is to integrate the flow rate of the pump, such as a syringe pump which are well known in the fluidic transport, particularly diagnostic analyzer art. This can be done by integrating the flow rate from a flow meter or the area under a pump profile curve (time vs. flow rate) for the length of time that the abnormality is detected. Upon integration the size of the error as represented by the integrated area will be known. In those instances where the error is the terminal event, the size of the error will be the entire area in the pump profile curve from the time the error is detected until the end of fluid handling event.

In a particularly preferred embodiment, the magnitude or volume of the error determined can be further refined by applying a correction for the volume change of air in the column and the viscous effects of the liquid. One way to correct this is through an ideal gas law correction described in connection with the preferred algorithm below.

Based upon the present invention, in those instances, where the inclusion of the error is the terminal event, a relation between the size of the error and the time the error begins to occur can be quantified, and hence integration of flow rate is not necessary. The following relation between the time and bubble size as shown in FIG. 3 was obtained. In the embodiment shown in FIG. 3, the y-axis shows volume error in microliters and the x-axis is time, with each one (1) time index equal to 5 milliseconds. As FIG. 3 shows, there is a direct correlation between the time when the threshold is trigged vs. the amount of volume error in aspirated liquid.

Thus, in a particularly preferred embodiment, the present invention provides a method to detect in an aspirate and dispense probe, an aspirated bubble size by correlating the time when air is aspirated to the size of the air bubble. This technique uses the sudden acceleration of the fluid flow (as measured by the sudden pressure rise inside the tip, such as described above) in the aspiration process to determine the time when the air is starting to enter the tip. The general procedure for carrying out this preferred embodiment is:

1. Obtain the pressure signature inside the tip with a pressure sensor.
2. Calculate the rate of the pressure change (the slope of the pressure signature) after pump starts deceleration.
3. Calculate the acceleration of the pressure change (the curvature of the pressure signature).
4. Set a threshold to detect the start of aspirating air into the tip using the rate of pressure change. When the rate of pressure change is larger than the threshold, the time is recorded as the time when air starts entering the tip.
5. Alternatively to step 4, for a pressure signature that is not detected by the previous rate of change, the curvature of the pressure signature is used to detect the start of air entering the tip. A curvature threshold (typically differs from the slope threshold) is used and the time when the curvature is larger than the threshold is the time when air starts entering the tip.

6. Correlate the time when the threshold is first surpassed to the air bubble size. The earlier the time, the larger the bubble. This correlation is established by directly measuring the error of the aspirated liquid and the time when an air bubble starts entering the tip.
7. A calibration curve is created from the above correlation as shown in FIG. 3.
8. Error in aspiration (the air bubble size) is detected by substituting the time when the threshold is reached to the calibration curve.

Now description will be made to the following preferred embodiment which uses a preferred algorithm to determine when a bubble is aspirated and quantified. The algorithm is aimed at quantifying aspirate volume errors caused by bubbles occurring, such as a result of an insufficient fluid fill in the primary sample container of a diagnostic analyzer.

Figure 4:
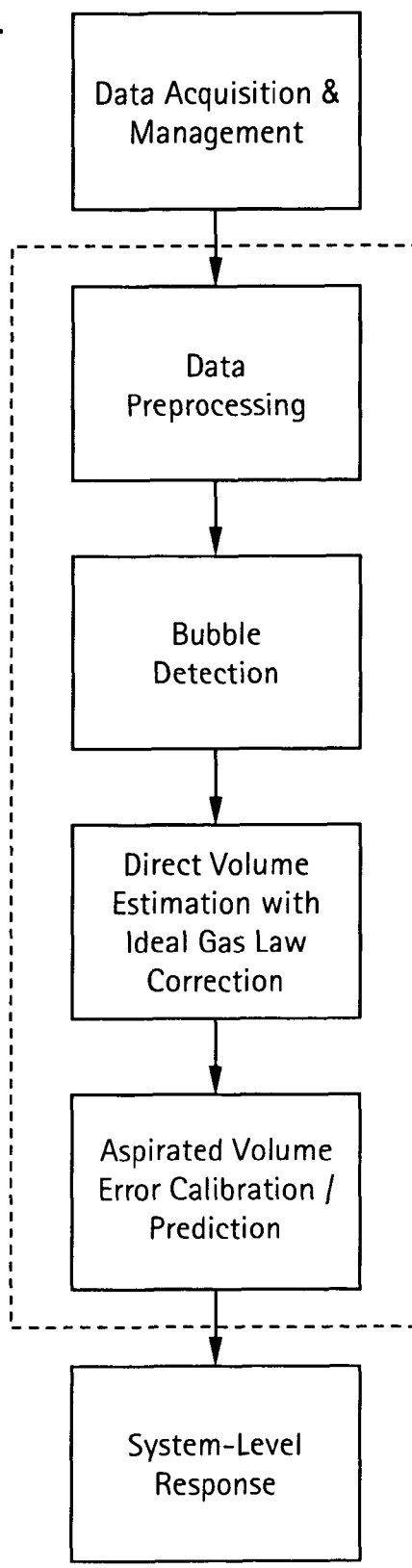
FIG. 4 is a flowchart showing high level functions of the aspirate volume-error algorithm according to a preferred algorithm of the present invention.

The preferred algorithm is summarized in the following high level function flowchart shown in FIG. 4. The functions inside the dashed box are described in the algorithm.

Figure 5:
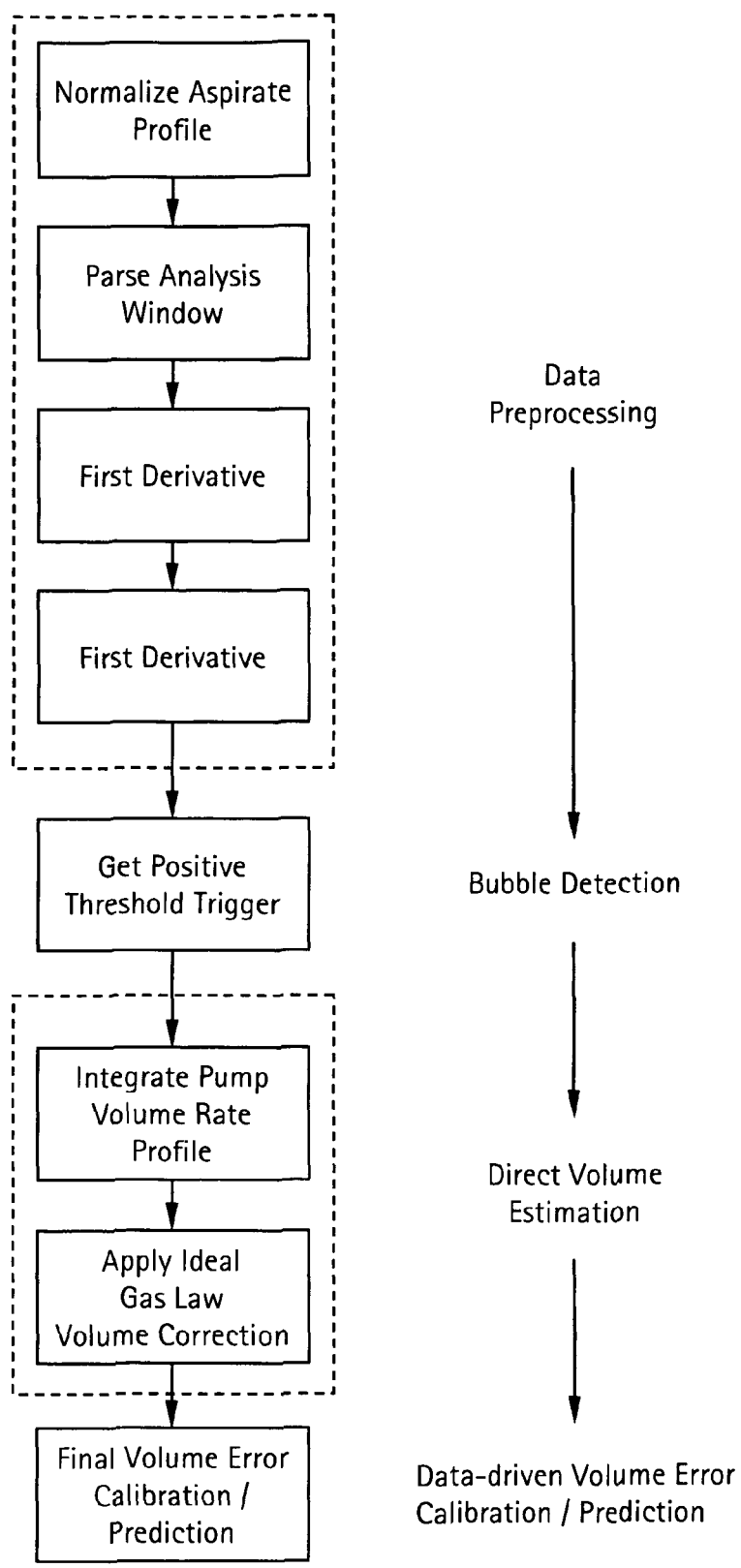
FIG. 5 is a flowchart showing the main functions of the aspirate volume-error algorithm according to a preferred algorithm of the present invention.

FIG. 5 shows more details of how the methodology is implemented for the insufficient fluid algorithms. The following sections describe these functions shown in FIGS. 4 and 5.

Data Preprocessing

Normalizing the Aspirate Profile

Rather than using raw A/D counts or absolute pressure data, in this embodiment the aspirate pressure profiles are normalized. This helps mitigate the effects on algorithm performance of site-to-site variation in ambient pressure. In this embodiment, the profile is scaled by an estimate of the "atmospheric pressure"—although these values are not in absolute pressure units. Normally, the pressure profile i.e., measured pressure signature, includes a few pressure values prior to the pump-on event (i.e, starting the syringe or piston pump) in the beginning and a few pressure values at the end after tip withdraw control begins. For a normal aspirate pressure profile, the atmospheric pressure for this event will occur at the beginning, near the pump-on event. The mean or median of the pressure profile samples prior to the pump-on event can be used for $P_{atm}$. A mathematical description of this normalization is:

$$P_{norm}(i) = \frac{P(i)}{P_{atm}} \text{ for } i = 1 \ldots N$$

It is preferable to use $P_{norm}(i) = P(i) - P_{atm}$, for $i=1 \ldots N$ since it is the pressure difference that drives fluid flow.

where $P_{atm}$ is an estimate of the atmospheric pressure during the prior to pump on event and N is the number of samples in the prior to pump on event.

Parse Analysis Window

The algorithm of this embodiment is directed at bubbles occurring in the mid to late portions of the aspirate profile. For this reason, an analysis window is parsed from this portion of the profile. However, other portions of the profile could be used depending on when the bubbles are detected. The profiles shown here are normalized.

The mid-point between the pump-off motor control time index and the pump-on time index defines the start index for the analysis window. The analysis window can go to the end of the available pressure data. Summarizing, the start index is given by:

$$\tau_{Start} = \left[ \frac{(\tau_{pump-off} + \tau_{pump-on})}{2} \right]$$

where tau is time. A computed time index for the pump-on event is required to ensure that the lengths of the pressure signal and the estimated pump rate profile are equal. The section below on estimating the pump rate profile describes how this pump-on time index is computed.

Estimating the First Derivative (i.e., Rate of Pressure Change)

The processing steps for this function are based on the numerical methods for smoothing and differentiation of data described in the reference, A. Savitzky and M. Golay, *Smoothing and Differentiation of Data by Simplified Least Squares Procedures*, Analytical Chemistry, Vol. 36, No. 8, July 1964, incorporated herein by reference in its entirety. One way for estimating the first derivative of the pressure signal is a method similar to a moving average. In this procedure, a fixed number of contiguous samples, or a "window", is selected at the beginning of the sequence of pressure values. The weighted sum of the values in the window is computed and then divided by a normalization factor. The result is the ordinate (or "y value") corresponding to the center abscissa (or "x value") of the window. Next, the sample at the beginning of the window is dropped and the next sample is added to the end (in essence shifting the window to the right by one sample) and the process is repeated.

The mathematical description of this process is:

$$dP_j = \frac{\sum_{i=-m}^{m} w_i P_{j+1}}{\Delta x N} \quad \text{for } j = m+1, \ldots, L-m$$

$$dP_j = dP_{m+1} \quad \text{for } j = 1, \ldots, m$$

$$dP_j = dP_{L-m} \quad \text{for } j = L-m+1, \ldots, L$$

Equation 1

Where, given the length of the window is M (i.e., a fixed number of contiguous samples), then the index of the sum is from −m to m where $$m = \left[ \frac{M}{2} \right].$$

In this embodiment, the brackets denote the "fix" or "truncate" function that takes the integer part of a real number. The parameter L is the number of samples in the original pressure profile. Note that the first m and last m samples of the derivative vector dP are not defined in the first equation because of the edge effects of the moving window process. For the purposes of this embodiment, these samples are simply assigned the derivative values computed for the first or last window. The weights are given by:

$$w = -m, \ldots, -1, 0, 1, \ldots, m$$

Equation 2

The denominator of Equation 1 is the product of the data interval (for the purposes of this method, the data interval Δx=1) and the normalization factor N. The normalization factor is computed as the sum of the squares of the weights:

$$N = \sum_{i=1}^{M} w_i^2 \quad \text{Equation 3}$$

Figure 6:
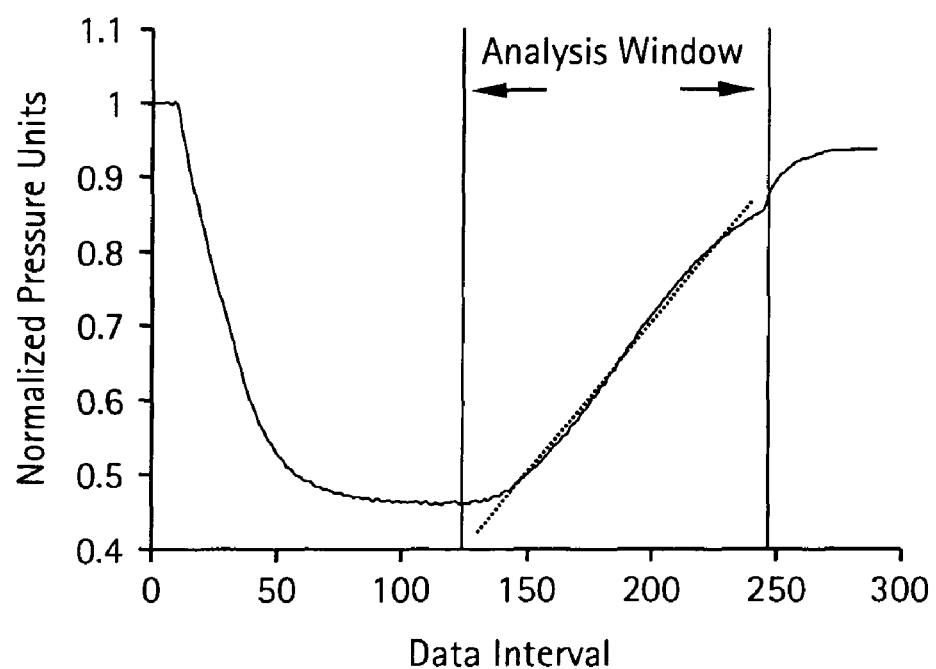
FIG. 6 shows a normal primary sample aspirate profile (normalize pressure vs. data interval) according to a preferred algorithm of the present invention.

The second derivative (i.e., acceleration of the pressure change) serves to significantly flatten the profile and allows lower thresholds for improved sensitivity to be set. An example of a normal aspirate profile (normalized pressure vs. data interval) is shown in FIG. 6. A nominal profile is fairly smooth and linear within the analysis window. This means the second derivative is close to zero and flat. In the embodiment

TABLE 1

| | Aspirate Pump Regimes (uL) | | | |
|---|---|---|---|---|
| | 30-59 | 60-119 | 120-200(cup) | 120-200(tube) |
| Threshold | 3.0E−03 | 2.0E−03 | 3.0E−03 | 2.9E−03 |

Direct Volume Error Estimation

Estimate Pump Aspirate Volume Rate Profile

The pump operates in four regimes based on the aspirate volume and whether the primary sample container is a cup or tube. The parameters for estimating the aspirate volume rate profile in each regime are tabulated below in Table 2. The pseudo-code for the rate profile calculation is also included.

TABLE 2

| Pump primary sample aspirate profile parameters. | | | | |
|---|---|---|---|---|
| Parameter | 30-59 uL | 60-119 uL | 120-200 cup | 120-200 tube |
| AccelSteps | 150 | 250 | 414 | 414 |
| AccelTime | 0.142519 | 0.1462 | 0.176671 | 0.145279 |
| DecelSteps | 300 | 700 | 1500 | 1050 |
| DecelTime | 0.26205 | 0.384376 | 0.64009 | 0.3839 |
| NormCoef | −2.4 | −2.4 | −2.85 | −2.85 |
| SlewVelocity | 1500 | 2800 | 4000 | 5000 |

```
SampleRate = 200;
StepsPerMicroLiter = 16.55;
NumTimeSteps = PumpOffIndex − PumpOnIndex + 1;
dt = 1/SampleRate;
tLinear = 0;
tNorm = 0;
For k = 0 to NumTimeSteps-1
  t = k * dt;
  if ( t <= AccelTime )
    Rate(k) = ( ((SlewVelocity − 600)/StepsPerMicroLiter).*(tLinear/AccelTime) ) + 36;
    tLinear = tLinear + dt;
  else if ( (t >= AccelTime) & (t <= AccelTime + SlewTime) )
    Rate(k) = SlewVelocity/StepsPerMicroLiter;
  else if ( (t > AccelTime + SlewTime) & (t <= AccelTime + SlewTime + DecelTime) )
    Rate(k) = ( (SlewVelocity − 595.8) * exp(NormCoef*(tNorm./DecelTime)^2)/StepsPerMicroLiter) + 36;
    tNorm = tNorm + dt;
  end if
End For
``` of FIG. 6, each one (1) data interval is 5 milliseconds. Pressure profiles after all of the preprocessing steps confirm that it is apparent that larger volume errors are associated with early onset of the bubbles. This trend, that the earlier the onset of bubbles is the larger is the associated volume error, is very repeatable across aspirate volumes and viscosities.

Bubble Detection

Get Positive Threshold Trigger

Figure 7:
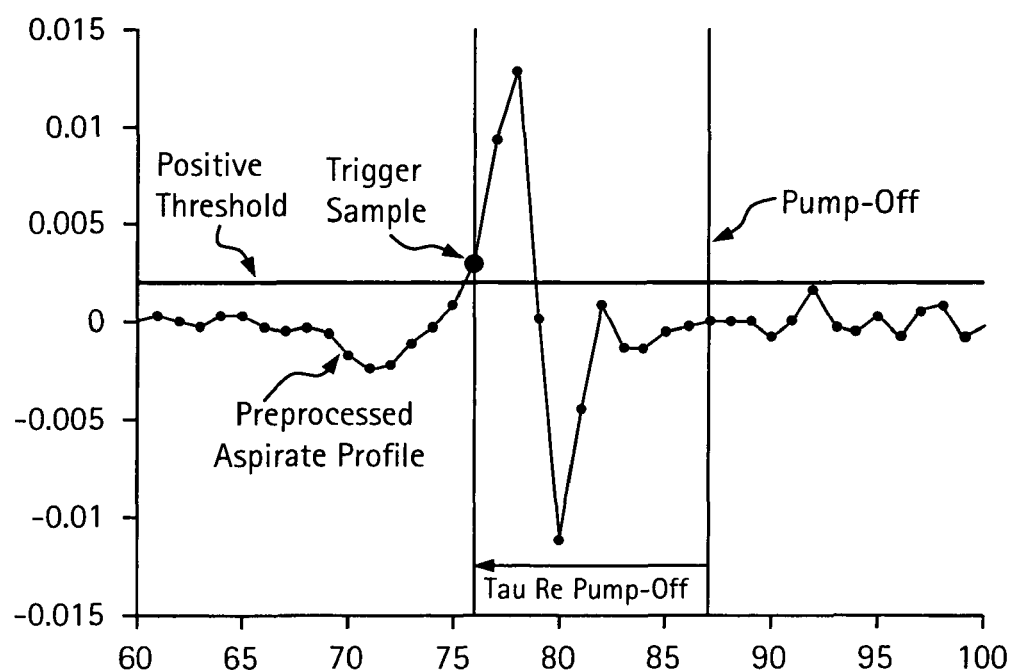
FIG. 7 shows the definition of the trigger sample relative to the pump-off event according to a preferred algorithm of the present invention.

FIG. 7 shows the parameters used to determine the delay associated with the positive threshold. The preprocessed aspirate profile is searched from left to right for the first sample that equals or exceeds the positive threshold. This is the trigger sample relative to the beginning of the profile. The threshold for each operating regime of the pump in a preferred embodiment are tabulated below in Table 1. In the embodiment of FIG. 7, the y-axis is the rate of pressure change and each one (1) time index is 5 milliseconds.

Estimate Pump-on Time Index

Using the values in Table 2, the following pseudo-code describes the algorithm for estimating the pump-on time index, $\tau_{pump\text{-}on}$. This value is used to select the start time index as described above. The floor function rounds to the nearest integer values toward minus infinity.

TotalSteps=*Vol*\*16.55;

SlewSteps=TotalSteps−AccelSteps−DecelSteps;

SlewTime=SlewSteps/*V*slew;

//Determining the total driving function time length.

TotalTime=AccelTime+SlewTime+DecelTime;

//Determining how many reads the profile should be.

SampleRate=0.005;

Samples=TotalTime/SampleRate;

//Determining the start index.

AspStartIndex=floor(MotorOffIndex−Samples);

Integrate Volume Rate Profile

Figure 8:
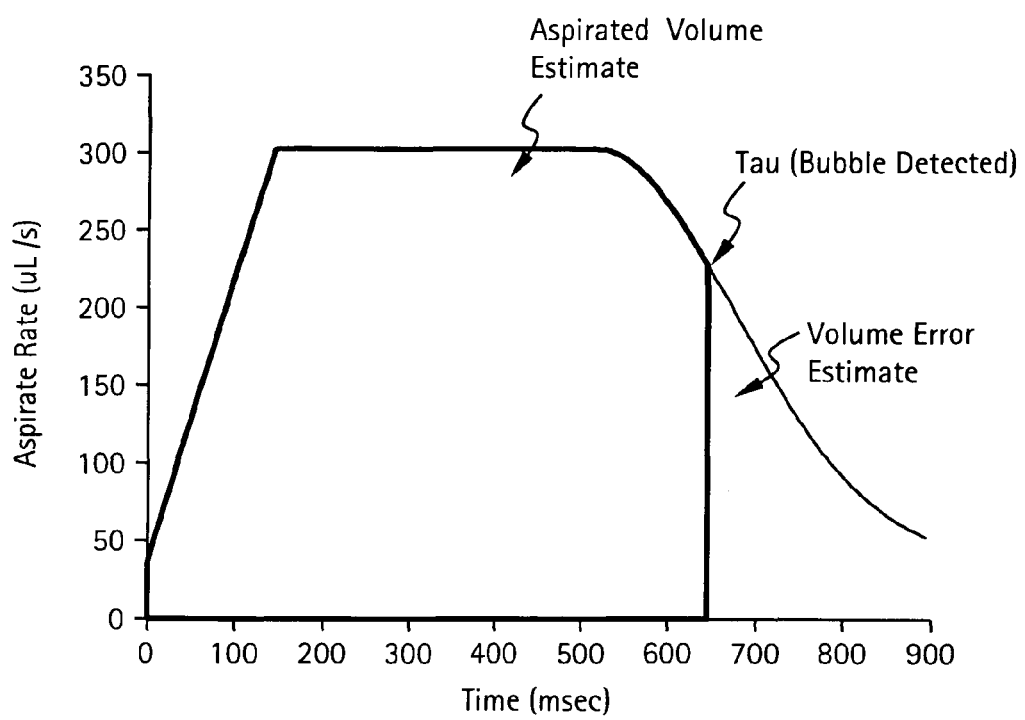
FIG. 8 shows the volume rate profile for a 200 uL primary sample aspirate according to a preferred algorithm of the present invention.

To estimate the aspirate volume error, one can numerically integrate the volume rate profile for a primary sample aspirate event. This approach is depicted in FIG. 8. Once one has the pump aspirate volume rate profile Q(t) (uL/second), one can derive an estimate of the volume error by integrating up to the time at which the bubble is first detected, Tau ($\tau$), and subtracting that area from the total area under the profile. This is summarized mathematically as:

$$V_{error} = \int_0^N Q(t) - \int_0^\tau Q(t)$$

where N is the total time of the aspirate event and $\tau$ is the sample index at which the bubble is detected relative to the start of the aspirate event. In this case, one needs to measure $\tau$ relative to the start of the original profile, and one can make a small adjustment to get a time index just before the bubble arrival, so:

$$\tau = \tau_{TriggerReStart} - 5$$

One uses the trapezoidal method (with uniform spacing) to numerically approximate the integrals. This method is given by the following iteration:

$$V_0 = 0$$

$$V_i = V_{i-1} + \left(\frac{Q_i + Q_{i-1}}{2}\right)\Delta t, \quad for\ i = 1, \ldots, N-1$$

where $\Delta t = 1/200$ sps = 0.005 seconds, is the time step between samples, and N is the upper limit of the integral.

Ideal Gas Law Correction

The volume error estimate based on integrating the pump rate profile described above does not account for volume change of the air column or viscous effects of the fluid. To account for these effects on the aspirated volume, one makes the following correction:

$$V_{error} = \int_0^N Q(t) - \int_0^\tau Q(t) + \delta V$$

where:

$$\delta V = \left[\left[\left(\frac{P_{abs}(0)}{P_{abs}(\tau)}\right) \cdot V_0^\gamma\right]^{\frac{1}{\gamma}} - V_0\right] \cdot 1000$$

$V_0 = 0.100$ mL is the air volume between the piston and the aspirated liquid before aspiration starts. $V_0$ is nominally 300 uL. The value of 100 uL in the preferred algorithm is a correction for a "stiffer" system that helps with accuracy and precision on the volume estimate. $\gamma = 1.4$ is dimensionless. $P_{abs}$ is air pressure inside the tip. $P_{abs}(0)$ is the atmospheric pressure. Again, this can be estimated by averaging a few samples at or before the pump-on time index. $P_{abs}(\tau)$ is the air pressure inside tip at the time index, relative to the start of the original profile, where the bubble is detected. This volume error estimate will be in uL and will be positive for under aspirated volumes and negative for over aspirated volumes.

Linear Calibration

To optimize accuracy for this embodiment, a linear calibration is performed on the data used for development and the calibration coefficients are applied in the final prediction process. This linear correction for the final volume error estimate is described in the following section.

Final Volume Error Estimate

The final volume error estimate is computed by applying the slope and offset coefficients from the linear calibration. This can be done using the vector product:

$$\hat{V}_{error} = [1 \quad V_{error}]\begin{bmatrix} w_1 \\ w_2 \end{bmatrix}$$

The coefficients (Ws) are derived at specific volumes and are listed in the following Table 3.

TABLE 3

| | Aspirate Pump Regimes (uL) | | | |
|---|---|---|---|---|
| | 30-59 | 60-119 | 120-200(cup) | 120-200(tube) |
| $w_1$ | 1.5760 | 0.9650 | 0.6229 | −2.6849 |
| $w_2$ | −1.6302 | −1.2546 | −1.0939 | −0.9412 |

The resulting volume error estimates are defined so that negative values correspond to underfills. A zero value corresponds to a sample aspirate event in which the estimate indicates that the exact target volume has been aspirated.

Thresholds for Setting Flags

In a preferred embodiment, it is desirable to detect insufficient fills of 10 uL or more. For a perfect volume error estimate, the threshold would be set to −10 uL. Sample aspirate events with volume errors at or below this threshold would then be flagged. However, because of variability in volume error estimates, the threshold setting has an associated sensitivity and specificity. In the studies described below, the thresholds were varied and a ROC curve indicating the sensitivity and false positive rates was developed for each pump regime.

The following Table 4 indicates the threshold settings for each pump regime required to achieve an estimated 100% sensitivity based on experimental measurements. If $\hat{V}_{error}$ is less than or equal to this threshold, then flag an insufficient aspirate. Table 5 contains tabulated sensitivity and false positive rates for varying thresholds for based on collected data samples.

TABLE 4

| | Aspirate Pump Regimes (uL) | | | |
|---|---|---|---|---|
| | 30-59 | 60-119 | 120-200(cup) | 120-200(tube) |
| Threshold | −5.6 | −4.1 | −4.2 | −4.9 |

TABLE 5

| 30-59 uL | | | 60-119 uL | | | 120-200 uL in a cup | | | 120-200 uL in a tube | | |
|---|---|---|---|---|---|---|---|---|---|---|---|
| Threshold | $P_D$ | $P_{FA}$ | Threshold | $P_D$ | $P_{FA}$ | Threshold | $P_D$ | $P_{FA}$ | Threshold | $P_D$ | $P_{FA}$ |
| -9.662 | 0.900 | 0.005 | -10.653 | 0.909 | 0.024 | -10.332 | 0.902 | 0.013 | -10.750 | 0.618 | 0.007 |
| -9.347 | 0.900 | 0.005 | -10.109 | 0.920 | 0.032 | -9.724 | 0.916 | 0.013 | -10.020 | 0.618 | 0.014 |
| -9.032 | 0.911 | 0.005 | -9.566 | 0.937 | 0.032 | -9.116 | 0.937 | 0.013 | -9.290 | 0.676 | 0.027 |
| -8.717 | 0.922 | 0.005 | -9.022 | 0.949 | 0.040 | -8.508 | 0.937 | 0.013 | -8.561 | 0.716 | 0.128 |
| -8.402 | 0.933 | 0.010 | -8.478 | 0.954 | 0.040 | -7.900 | 0.944 | 0.025 | -7.831 | 0.725 | 0.196 |
| -8.086 | 0.944 | 0.014 | -7.935 | 0.960 | 0.040 | -7.292 | 0.951 | 0.038 | -7.102 | 0.784 | 0.243 |
| -7.771 | 0.956 | 0.019 | -7.391 | 0.971 | 0.040 | -6.684 | 0.958 | 0.051 | -6.372 | 0.843 | 0.318 |
| -7.456 | 0.956 | 0.029 | -6.848 | 0.983 | 0.064 | -6.076 | 0.965 | 0.070 | -5.643 | 0.941 | 0.439 |
| -7.141 | 0.967 | 0.038 | -6.304 | 0.983 | 0.064 | -5.468 | 0.972 | 0.083 | -4.913 | 1.000 | 0.541 |
| -6.826 | 0.978 | 0.048 | -5.760 | 0.983 | 0.104 | -4.860 | 0.993 | 0.115 | -4.183 | 1.000 | 0.682 |
| -6.511 | 0.989 | 0.057 | -5.217 | 0.994 | 0.192 | -4.252 | 1.000 | 0.185 | -3.454 | 1.000 | 0.993 |
| -6.195 | 0.989 | 0.071 | -4.673 | 0.994 | 0.248 | -3.644 | 1.000 | 0.293 | -2.724 | 1.000 | 1.000 |
| -5.880 | 0.989 | 0.086 | -4.129 | 1.000 | 0.256 | -3.036 | 1.000 | 0.338 | | | |
| -5.565 | 1.000 | 0.143 | -3.586 | 1.000 | 0.344 | -2.428 | 1.000 | 0.459 | | | |
| -5.250 | 1.000 | 0.176 | -3.042 | 1.000 | 0.424 | | | | | | |
| -4.935 | 1.000 | 0.229 | -2.498 | 1.000 | 0.432 | | | | | | |
| -4.620 | 1.000 | 0.238 | -1.955 | 1.000 | 0.448 | | | | | | |
| -4.304 | 1.000 | 0.286 | | | | | | | | | |
| -3.989 | 1.000 | 0.310 | | | | | | | | | |
| -3.674 | 1.000 | 0.348 | | | | | | | | | |
| -3.359 | 1.000 | 0.414 | | | | | | | | | |
| -3.044 | 1.000 | 0.443 | | | | | | | | | |
| -2.728 | 1.000 | 0.452 | | | | | | | | | |
| -2.413 | 1.000 | 0.471 | | | | | | | | | |
| -2.098 | 1.000 | 0.490 | | | | | | | | | |

Once the size of the error has been determined, the next step will be to determine how the system utilizing the fluid handling system will respond to the detection and quantification of the error. In a preferred embodiment, the particular analysis in which the error occurred will not be discarded. Instead, once the magnitude of the error is known, and hence, the actual amount of fluid aspirated, the remainder of the analysis can be adjusted for the actual amount of fluid aspirated. For example, if a lesser amount of sample is aspirated then an analysis protocol requires, the analyzer can automatically adjust the amount of reagents added to preserve the proper proportions of reagents and sample, or the reported result can be corrected.

The fluid handling method according to the present invention can be implemented by a computer program, having computer readable program code, interfacing with the computer controller of the analyzer as is known in the art.

It will be apparent to those skilled in the art that various modifications and variations can be made to the compounds, compositions and processes of this invention. Thus, it is intended that the present invention cover such modifications and variations, provided they come within the scope of the appended claims and their equivalents.

The disclosure of all publications cited above are expressly incorporated herein by reference in their entireties to the same extent as if each were incorporated by reference individually.

The invention claimed is:

1. A method for quantitatively measuring error causing physical parameters in a liquid aspirate or dispense operation of an aspirate or dispense probe, comprising:
   measuring the pressure of air between a piston of a pump of the aspirate or dispense probe and a liquid being handled;
   detecting a pressure abnormality due to the error causing physical parameter;
   determining the time at which the pressure abnormality begins to occur after the measuring of the air pressure has commenced; and
   based on the time of the pressure abnormality determining the magnitude of the physical parameter causing the pressure abnormality.

2. A method as claimed in claim 1, wherein the liquid aspirate or dispense operation is a liquid aspirate operation.

3. A method as claimed in claim 1, wherein the error causing the pressure abnormality are one or more of clogs, clots, debris, bubbles or foam.

4. A method as claimed in claim 3, wherein the error causing the pressure abnormality is a bubble.

5. A method as claimed in claim 1, wherein the step of measuring pressure includes measuring the rate of change of the pressure.

6. A method as claimed in claim 1, wherein the step of measuring pressure includes measuring the acceleration of the pressure change.

7. A method as claimed in claim 5, wherein the step of detecting a pressure abnormality comprises:
   establishing a measured pressure signature for a similar liquid aspirate or dispense where an error does not occur;
   comparing the rate of change of the pressure of the liquid being aspirated or dispensed with the rate of change in the measured pressure signature at the same time; and
   determining if the rate of change of the pressure being measured exceeds a threshold rate of change.

8. A method as claimed in claim 7, wherein the threshold is a predetermined threshold.

9. A method as claimed in claim 1, wherein the step of determining the magnitude includes determining the flow rate of the liquid being dispensed or aspirated and integrating the flow rate when the pressure abnormality is detected, wherein the integrated flow rate is proportional to the magnitude of the error.

10. A method as claimed in claim 9, wherein the ideal gas law is used together with the integrated flow rate to determine the magnitude of the error.

11. A method as claimed in claim 9, wherein the flow rate is integrated until the pressure abnormality is no longer detected.

12. A method as claimed in claim 1, wherein the error causing physical parameter is the terminal event in the liquid being dispensed or aspirated and the earlier in time the pressure abnormality is determined, then the larger magnitude of the error causing physical parameter.

13. A method as claimed in claim 12, wherein the magnitude of the error is determined by the time the error is detected using a calibration curve of time vs. error size.

14. A method for quantitatively measuring the volume of a bubble in a liquid handing system having an aspirate or dispense probe of a diagnostic analyzer during a liquid aspirate operation, comprising:
   measuring the pressure of air between a piston of a pump of the aspirate or dispense probe and a liquid being handled;
   detecting a pressure abnormality due to aspiration of the bubble;
   determining the time at which the pressure abnormality begins to occur after the measuring of the air pressure has commenced; and
   based on the time of the pressure abnormality determining the magnitude of the bubble causing the pressure abnormality.

15. A method for quantitatively measuring the volume of a bubble in a liquid handling system having an aspirate or dispense probe of a diagnostic analyzer during a liquid aspirate operation comprising:
   measuring the pressure of air between a piston of the aspirate or dispense probe of a pump and a liquid being handled;
   detecting a pressure abnormality due to aspiration of the bubble;
   determining the time at which the pressure abnormality begins to occur; and
   based on the time of the pressure abnormality determining the magnitude of the bubble causing the pressure abnormality,
   establishing a measured pressure signature for liquid aspirate where a bubble is not aspirated;
   determining a flow rate of the liquid being aspirated;
   measuring the pressure rate of change of the liquid being aspirated;
   comparing the pressure rate of change of the liquid being aspirated with the rate of change in the measured pressure signature at the same time;
   determining if the pressure rate of change being measured exceeds a threshold rate of change due to the aspiration of the bubble;
   integrating the flow rate if the threshold rate of change is exceeded, wherein the integrated flow rate is proportional to the bubble size.

16. A method as claimed in claim 15, further using the ideal gas law to correct for liquid viscosity and the air between the piston pump and liquid being handled.

17. A method for quantitatively measuring the volume of a bubble in a liquid handling system having an aspirate or dispense probe of a diagnostic analyzer during a liquid aspirate operation comprising:
   measuring the pressure of air between a piston of a pump of the aspirate or dispense probe and a liquid being handled;
   detecting a pressure abnormality due to aspiration of the bubble;
   determining the time at which the pressure abnormality begins to occur; and
   based on the time of the pressure abnormality determining the magnitude of the bubble causing the pressure abnormality,
   establishing a measured pressure signature for a liquid aspirate where a bubble is not aspirated;
   determining a flow rate of the liquid being aspirated;
   measuring the acceleration of pressure change of the liquid being aspirated;
   comparing the acceleration of pressure change of the liquid being aspirated with the acceleration of pressure change in the measured pressure signature at the same time;
   determining if the pressure rate of change being measured exceeds a threshold rate of change due to the aspiration of the bubble;
   integrating the flow rate if the threshold rate of change is exceeded, wherein the integrated flow rate if proportional to the bubble size.

18. A method as claimed in claim 17, further using the ideal gas law to correct for liquid viscosity and the air between the piston pump and liquid being handled.

19. A method for quantitatively measuring the volume of a bubble in a liquid handling system having an aspirate or dispense probe of a diagnostic analyzer during a liquid aspirate operation comprising:
   measuring the pressure of air between a piston of a pump of the aspirate or dispense probe and a liquid being handled;
   detecting a pressure abnormality due to aspiration of the bubble;
   determining the time at which the pressure abnormality begins to occur; and
   based on the time of the pressure abnormality determining the magnitude of the bubble causing the pressure abnormality; and
   establishing a correlation between the size of the bubble and the time the aspiration of the bubble begins, wherein the determining the magnitude step comprises, measuring the time the bubble is aspirated and determining the bubble size based on the correlation between bubble size and time.

20. A method for quantitatively measuring the volume of a bubble in a liquid handing system having an aspirate or dispense probe of a diagnostic analyzer during a liquid aspirate operation, comprising:
   measuring the pressure of air between a piston of the aspirate or dispense probe of a pump and a liquid being handled;
   detecting a pressure abnormality due to aspiration of the bubble;
   determining the time at which the pressure abnormality begins to occur; and
   based on the time of the pressure abnormality determining the magnitude of the bubble causing the pressure abnormality; and
   determining if the bubble exceeds a predetermined size and if the bubble exceeds the predetermined size activating an alarm condition.

21. A method for quantitatively measuring the volume of a bubble in a liquid handing system having an aspirate or dispense probe of a diagnostic analyzer during a liquid aspirate operation, comprising:

measuring the pressure of air between a piston of a pump of the aspirate or dispense probe and a liquid being handled;

detecting a pressure abnormality due to aspiration of the bubble;

determining the time at which the pressure abnormality begins to occur; and based on the time of the pressure abnormality determining the magnitude of the bubble causing the pressure abnormality; and determining the amount of liquid actually aspirated based on the bubble size and further comprising aspirating or dispensing an additional liquid, wherein the amount of additional liquid aspirated or dispensed is adjusted based on the amount of the liquid actually aspirated or dispensed.

22. A method as claimed in claim 21, wherein the liquid and additional liquid are selected from a liquid reagent or sample.

23. A method as claimed in claim 16, wherein the flow is provided by a pump.

24. A method as claimed in claim 23, wherein the determining of the flow rate is by the pumping rate of the pump.

25. A method as claimed in claim 14, wherein the pressure measurement for determining the pressure rate of change is by a pressure transducer.

26. A method of aspirating a liquid used in a diagnostic analyzer having an aspirate or dispense probe, comprising:

providing a source of liquid to be aspirated;
providing a probe for aspirating and dispensing the liquid;
moving the probe relative to the liquid;
aspirating the liquid;
quantitatively measuring the volume of a bubble aspirated with the liquid;

measuring the pressure of air between a piston of a pump of the aspirate or dispense probe and a liquid being handled;

detecting a pressure abnormality due to aspiration of the bubble;

determining the time at which the pressure abnormality begins to occur; and based on the time of the pressure abnormality determining the magnitude of the bubble causing the pressure abnormality; and determining the actual amount of liquid aspirated based on the detected size of the bubble.

27. A method according to claim 1 implemented by a computer program interfacing with a computer.

28. A method according to claim 1, wherein the air pressure is detected by a pressure transducer.

29. A method according to claim 14, wherein the air pressure is detected by a pressure transducer.

30. A method according to claim 15, wherein the air pressure is detected by a pressure transducer.

31. A method according to claim 17, wherein the air pressure is detected by a pressure transducer.

32. A method according to claim 19, wherein the air pressure is detected by a pressure transducer.

33. A method according to claim 20, wherein the air pressure is detected by a pressure transducer.

34. A method according to claim 21, wherein the air pressure is detected by a pressure transducer.

35. A method according to claim 26, wherein the air pressure is detected by a pressure transducer.

\* \* \* \* \*